E. MURPHY.
SEWING-MACHINE.
No. 176,880. Patented May 2, 1876.
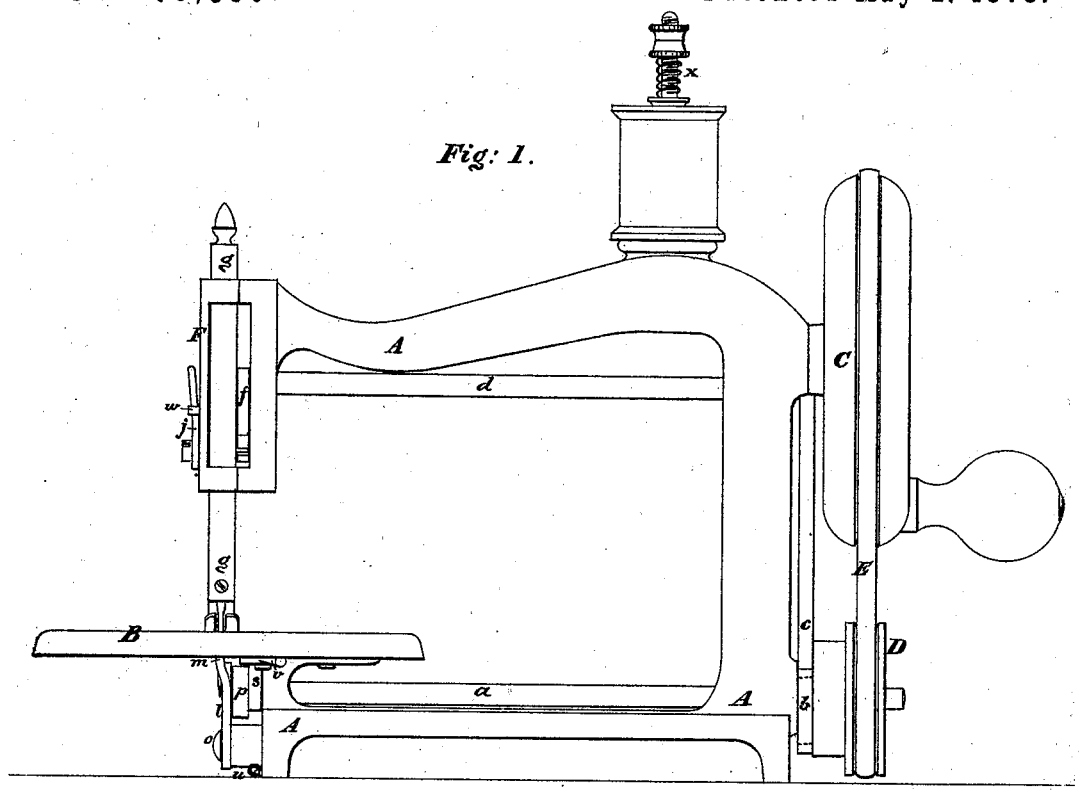
*Fig: 1.*
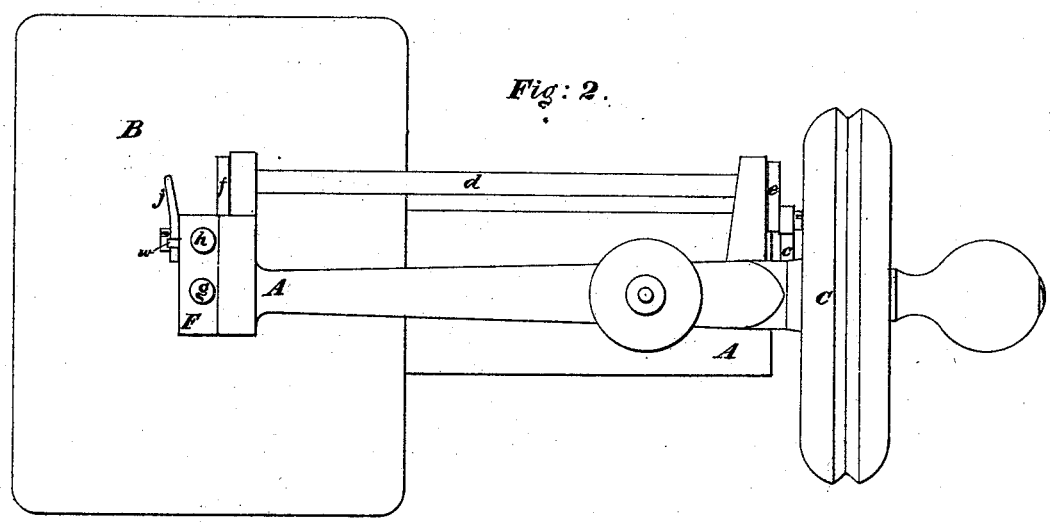
*Fig: 2.*
Witnesses.
Hugh Callary
E. J. French
Inventor.
Edward Murphy
By Thos. A. Macauley
Attorny.

E. MURPHY.
SEWING-MACHINE.
No. 176,880. Patented May 2, 1876.
2 Sheets—Sheet 2.
Fig: 3.
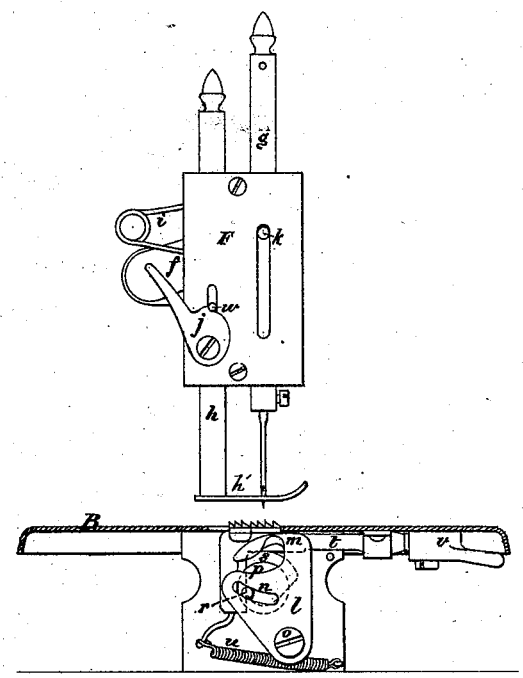
Witnesses.
Hugh Gallary
E. F. French
Inventor.
Edward Murphy
By Thos. A. Maculily
Attorney

UNITED STATES PATENT OFFICE

EDWARD MURPHY, OF NEW YORK, N. Y.

IMPROVEMENT IN SEWING-MACHINES.

Specification forming part of Letters Patent No. 176,880, dated May 2, 1876; application filed January 28, 1875.

*To all whom it may concern:*

Be it known that I, EDWARD MURPHY, of New York, county of New York, and State of New York, have invented a certain new and useful Improvement in Sewing-Machines; and I do hereby declare that the following is a full, clear, and exact description of the same, reference being had to the accompanying drawings, forming a part of this specification, in which—

Figure 1 is a side elevation; Fig. 2, a top or plan view of the same, and Fig. 3 an end view.

The purpose and object of the present invention are to construct a sewing-machine which can be manufactured at a greatly-reduced cost, and at the same time be durable and effective in use; and it is designed more particularly as an improvement in that class of sewing-machines known as "chain-stitch machines," and consists in the combination and arrangement of the several parts, as will be hereinafter more fully described, and subsequently pointed out in the claim.

In many chain-stitch machines heretofore, the lower shaft has been a rock-shaft, serving to operate the feed and looper, the upper shaft being a rotary shaft for operating the needle-bar, and working the lower rock-shaft; but in machines so constructed a difficulty is met with in moving the feed in the right time relative to the needle-bar.

In my improved sewing-machine, constructed as will be presently described, the shafts are reversed by making the lower one a rotary shaft, and operating thereby the stitch-making mechanism and the feeding device, and having the upper shaft a rock-shaft, for operating the needle-bar.

In the accompanying drawings, A represents the frame of the machine, to which is connected the cloth-plate B and speed-wheel D, with the driving pulley C, belt E, and the face-plate F. Connected to the speed-wheel D, and passing through the lower part of the frame A, is the main shaft $a$, to the end of which is formed an eccentric, $b$, for receiving an eccentric rod, $c$, said rod being connected to the rock-shaft $d$ by a crank, $e$. Upon the front end of the rock-shaft $d$ is an arm, $f$, formed with a slotted end, for the reception of one end of a pin, $k$, upon the needle-bar $g$. The presser-bar $h$, carrying the foot $h'$, has secured thereto a spring, $i$, said bar being raised by a tipper, $j$.

The hook or looper, as shown at $l$, is formed of a single piece of sheet metal, and has a bend, $m$, and is pivoted at $o$ to the body of the machine. An oscillating motion is imparted to the hook or looper from the rotary shaft $a$ by a pin, $r$, thereon, working within a curved slot, $n$, said pin being secured eccentrically upon a circular disk, $p$.

Adjoining the circular disk $p$ on shaft $a$ is a feed-cam, $s$, for operating the feed-bar $t$, said feed-bar being forced back in place, after being operated on by the cam, by a spring, $u$. The motion of the bar $t$ is regulated by a regulator, $v$. The tipper $j$, in raising the pressure-bar, bears against a pin, $w$, thereon, working within a vertical slot in the face-plate F. Motion being given to the machine by turning the driving pulley C, the main shaft $a$ is revolved, giving to the shaft $d$ a rocking motion by the eccentric $b$, through the rod $c$ and crank $e$, which is rigidly secured to the shaft $d$, and to the needle-bar, through pin $k$ and crank $f$, the latter also being rigidly secured to the end of the shaft. Simultaneously with the motion of the needle-bar, the hook $l$ receives an oscillating motion from the shaft $a$ by means of the circular disk $p$ and pin $r$, the latter working within the curved slot $n$, the stitch being made in the manner usual in chain-stitch machines.

Having now fully described my invention, what I claim as new, and desire to secure by Letters Patent, is—

The upper oscillating bar $d$, with slotted arm $f$, for receiving the pin $k$ upon the needle-bar $g$, in combination with the lower rotary shaft $a$, having upon its end the disk $p$ and pin $r$, for operating the pivoted hook or looper, and the eccentric $s$, for operating the feed-bar $t$, the latter being regulated by the regulator $v$, substantially as and for the purpose set forth.

EDWARD MURPHY.

Witnesses:
THOS. A. MACAULEY,
RICHARD NEVILLE.